Patented Jan. 10, 1928.

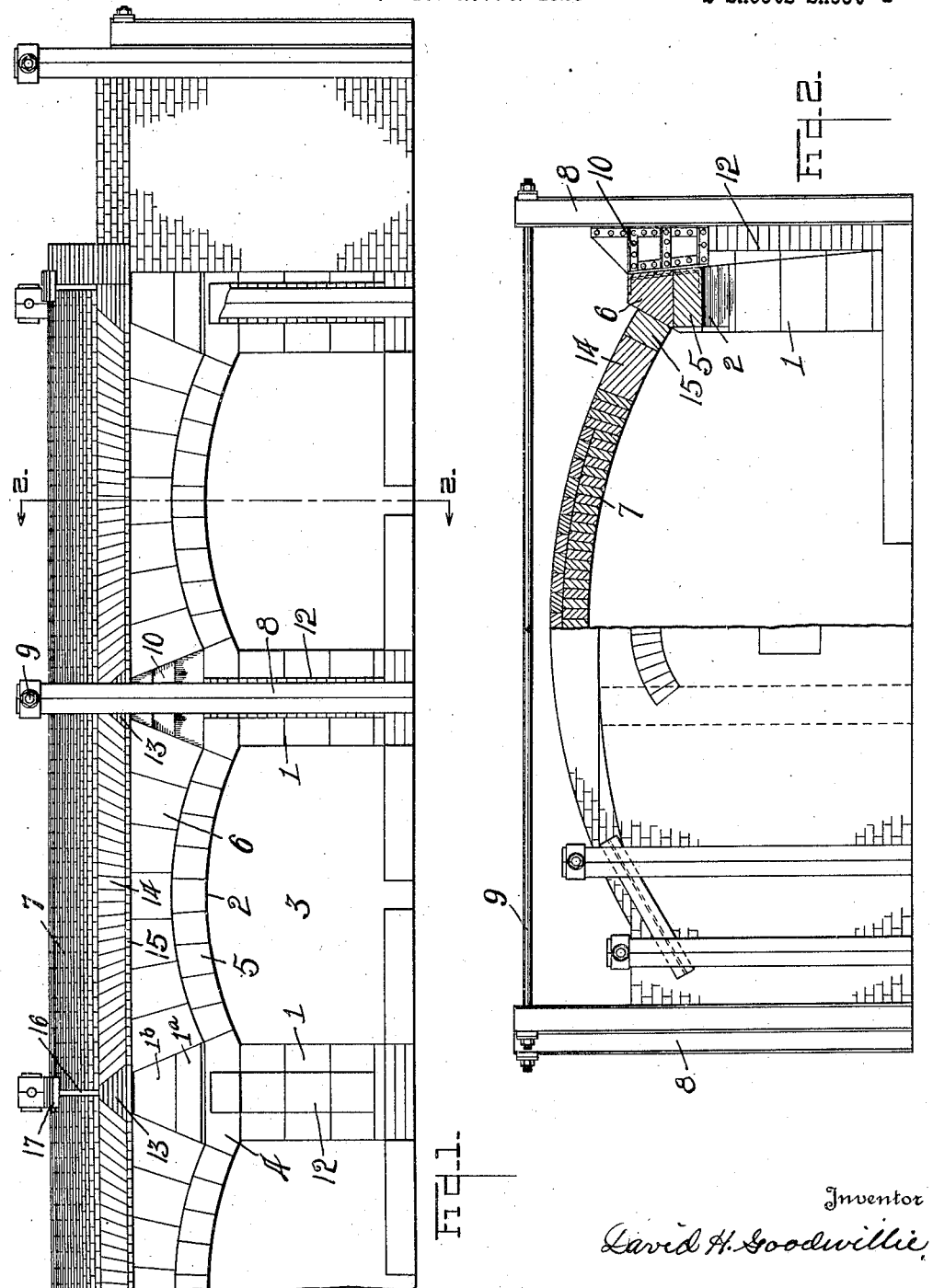

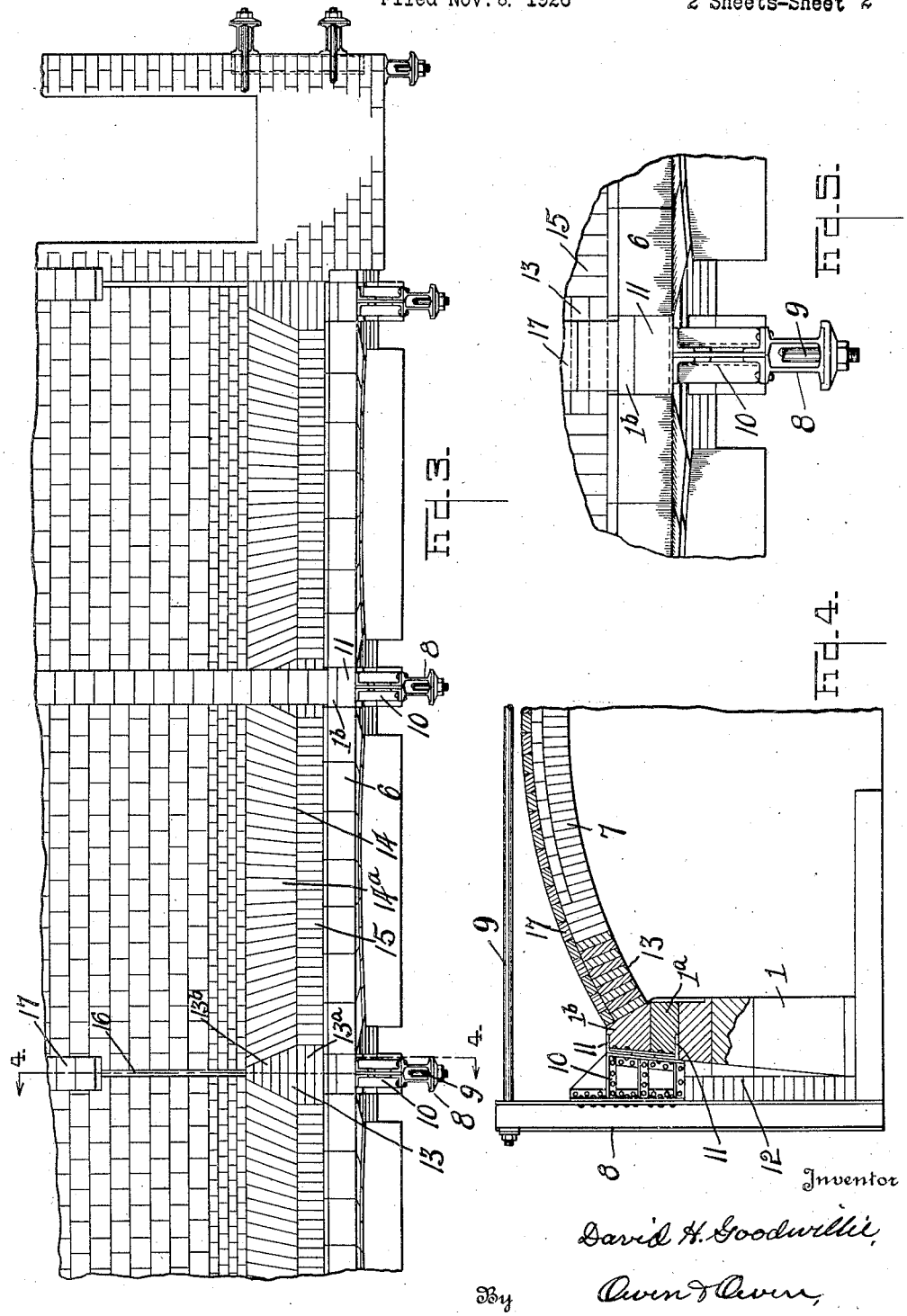

1,655,680

UNITED STATES PATENT OFFICE.

DAVID H. GOODWILLIE, OF TOLEDO, OHIO, ASSIGNOR TO THE EDWARD FORD PLATE GLASS COMPANY, OF ROSSFORD, OHIO, A CORPORATION OF OHIO.

FURNACE CONSTRUCTION.

Application filed November 8, 1926. Serial No. 147,028.

This invention relates to furnace construction, and particularly to furnaces of the character commonly used in plate glass manufacturing plants for the melting of glass or the ingredients forming the same.

In the upkeep of furnaces of this character, great trouble has been encountered in maintaining the furnaces in operative condition due to the fact that the fluxes used in the mix and the intense heat required for the melting of the materials cause rapid erosion and disintegration of the pillars and arch blocks forming the opening through which the pots are inserted into and withdrawn from the furnace.

In the furnace constructions heretofore employed for this purpose, the disintegration of the pillars and arches thereof necessitates a frequent closing down and entire cooling off of the furnace, in order for the injured parts to be replaced. The roof of the melting chamber in this type of furnace usually consists of an arch of refractory brick or blocks sprung from side to side of the furnace and extending lengthwise over the entire melting chamber, and having expansion joints at intervals to care for the expansion and contraction of the crown or roof under changing temperature conditions. This crown or roof rests upon and is carried by the pillars and arches forming the openings through which the pots are inserted into or removed from the furnace. The whole structure is supported horizontally and the outward thrust of the arches and pillars taken by buckstays which are buried in the floor structure of the building at their lower ends and have their upper ends limited in movement by adjustable tie rods extending longitudinally from end to end of the furnace structure and also crosswise of the same with the ends of these rods engaging the top of the respective buckstays.

With this construction, when it becomes necessary to renew or replace the supporting pillars and arches, it is necessary to remove the entire crown or roof, resulting in great loss of time and material, and entailing considerable expense. The roof itself seldom requires rebuilding by reason of its own defects, but due to the present construction of furnaces of this character, so far as I am aware, it is necessary to remove the roof in order to renew or replace the supporting pillars and arches.

The object of this invention is to provide a furnace structure which will permit a removal of the pillars and arches without disturbing the roof or crown structure, thereby materially reducing the time, labor, material and expense incident thereto over what has heretofore been required. In practice, it is found that it is necessary to replace the pillars and arches of glass melting furnaces about once every nine or ten months, and that the expense of removing and re-building the crown or roof alone runs in the neighborhood of $1200.00.

The invention is fully described in the following specification, and one embodiment thereof illustrated in the accompanying drawings, in which,—

Figure 1 is a front elevation of a bank of furnaces embodying the invention with portions broken away and removed. Fig. 2 is an end elevation thereof with a part in section on the line 2—2 in Fig. 1. Fig. 3 is a top plan view thereof with parts broken away. Fig. 4 is a section on the line 4—4 in Fig. 3, and Fig. 5 is an enlarged top plan view of a buckstay and its connection with the adjacent portion of the furnace.

Referring to the drawings, 1 designates the pillars and 2 the arches forming the openings 3 of the furnace through which the melting pots are inserted and withdrawn. These pillars and arches are built up of refractory brick or blocks, and each pillar is formed with a wedge shaped head portion 4 of substantially inverted U-form with their inclined sides receiving the end thrust of the respective arches 2. The arches 2 are preferably formed therebetween, the joint being of arched form and the upper edge of the top row 6, in the present instance, being substantially horizontal. This construction of arch enables the replacement of the lower or exposed portion of the arch, which becomes destroyed much earlier than the upper portion, without disturbing the upper portion and this may be done either in conjunction with or separately from the renewal of the pillar blocks.

7 is the crown or roof of the furnace and 8 are buckstays of the type customarily used in furnace construction and which are disposed in pairs crosswise of the furnace with a buckstay without each pillar 1. These buckstays have their lower ends buried in the floor structure of the building and have their upper ends tied together by cross or tie rods 9. Similar buckstays are also customarily employed at the ends of the furnace and tied together by stay rods extending lengthwise of the furnace. The provision of these latter buckstays have nothing, however, to do with the present invention.

Each side buckstay 8, which is disposed at a side of the arched roof structure 7, is provided with a bracket 10 disposed between the buckstay and upper end of the adjacent pillar 1 and rigidly connected at its outer side to the buckstay by bolts, riveting, or in any other suitable manner, and having rigid interengaging connection at its inner side with the upper end blocks of the pillar, in the present instance the two top blocks designated 1$^a$ and 1$^b$. For this purpose, the bracket 10 is provided with vertically spaced inwardly projecting flanges 11, the lower one of which fits into a recess provided between the lower outer edge of the block 1$^a$ and the next lower block of the pillar, and the upper flange engages over the upper side of the block 1$^b$, as best shown in Fig. 4. It is, therefore, apparent that the pillar blocks 1$^a$ and 1$^b$ are supported by the bracket 10 irrespective of whether or not the subjacent blocks of the pillar are in position, and also that the outward load thrust of the roof arch or crown, which is exerted against the block 1$^b$, is communicated to the associated buckstay through the bracket 10. 12 designate filler blocks that are inserted in the space below the bracket 10 and between the buckstays and pillar blocks.

The inner side of each pillar block 1$^b$ is inclined outwardly and upwardly from a point within the furnace and receives the thrust of a wedge-shaped thrust body 13 that is built into and forms a part of the roof structure. This thrust body, in the present instance, has its outer or large end portion 13$^a$, which bears against the block 1$^b$, provided with parallel sides disposed transverse to the furnace top and has its wedge portion 13$^b$ projecting inwardly from the portion 13$^a$ toward the roof center.

Between the oppositely inclined sides of each pair of thrust bodies 13 disposed at opposite ends of the arch 2 is what may be termed a flat jack arch or relieving arch 14. The jack arch 14 is composed of a plurality of blocks 14$^a$, the opposite sides of each of which are relatively inclined to a slight extent, so that when the blocks are built up outwardly in opposite directions from a center line which, in the present instance, is at right angles to the longitudinal center line of the furnace structure, the blocks will successively assume increasing angles of inclination with the outer sides of the end blocks bearing flat against the respective inclined sides of the associated thrust bodies 13. The inner and outer edges of the jack arches are preferably straight and in parallel relation to the longitudinal center line of the furnace and the portion of the roof 7, which is intermediate the jack arches 14 at opposite sides of the furnace, bears outwardly against the inner side edges of said arches and is supported thereby. It will be understood that the thrust bodies 13 disposed at the ends of the furnace have only a single inclined face, the thrust of the jack arch thereagainst being opposed by an end buckstay, or in any other suitable manner.

In the present embodiment of the invention, the outer side edges of the jack arches 14 are spaced from the inner sides of the arch blocks 6 a distance corresponding to to the thickness of the outer end portions 13$^a$ of the thrust bodies 13, and this space is filled by a row of blocks 15. The inner top side edges of the arch block 6 are inclined the same as the thrust blocks 1$^b$. The blocks 15 may be easily removed and are disposed between the jack arch 14 and side arch blocks 6 so that the jack arch blocks are prevented from being injured by the removal of the side arch blocks. In other words, the blocks 15 form a protecting facing edge for the associated jack arch.

The roof structure 7, aside from the provision of the jack arch blocks 14$^a$ and thrust bodies 13 at its marginal edge portions, is the same as commonly employed in furnaces of this character. The transversely extending spaces 16 in the roof indicate expansion joints which are disposed transversely of the roof between thrust bodies 13 at opposite sides of the furnace. These spaces are closed by blocks 17 loosely mounted on the roof and extending in rows over the joints 16 from end to end thereof, the rows extending at their ends over the respective thrust bodies 13 and having end thrust engagement with the respective blocks 1$^b$, as shown in Figure 4.

It is apparent that with the construction of furnace herein shown and described the roof 7 is supported entirely by the brackets 10 through the intermediate jack arches 14, thrust bodies 13 and top pillar blocks 1$^a$ and 1$^b$, and that the brackets 10 are supported in rigid relation by the associated buckstays 8 and tie-rods 9. This makes it possible to entirely remove the arch blocks 5 and 6 and the pillar blocks below the top blocks 1$^a$ thereof and to re-build said arches and pillars without in any way disturbing the roof structure.

This is a very important feature when it is considered that with the furnace constructions heretofore employed, so far as I am aware, the arch and pillar blocks cannot be removed for the purpose of replacement without removing or tearing down the roof; that in ordinary practice the arch and pillar blocks of a furnace of this character require replacement about every nine or ten months, and that the tearing down and rebuilding of the roof alone costs in the neighborhood of $1200.00. Inasmuch as the roof itself seldom requires re-building due to its own defects, it is estimated that the roof could be used for several years without replacement.

I wish it understood that my invention is not limited to any specific construction, arrangement or form of the parts, as it is capable of numerous modifications and changes without departing from the spirit of the claims.

Having thus described my invention, what I claim as new and desire to secure by Letters Patent is:

1. In a furnace structure of the class described, a roof having a jack arch forming a side edge portion thereof, and means spaced longitudinally of the furnace having supporting parts spaced lengthwise of the furnace and receiving the respective end thrusts of the jack arch and supporting the roof therethrough.

2. A furnace of the class described, having a side arch portion and a roof portion, and means independent of the side arch portion including an integral jack arch in the adjacent edge portion of the roof portion for supporting the roof portion independently of the arch portion.

3. A furnace structure of the class described, having an arched roof and a side arch portion, and means independent of the arch portion for supporting the roof, said means including uprights without the arch portion and thrust means along the edge of the roof adapted to concentrate the roof load at points opposite said uprights and to distribute the load thereto.

4. In a furnace structure, a roof, a side arch portion meeting the edge of the roof, buckstays at the outer side of the arch portion and disposed at the ends of an arch, a thrust bracket carried by each buckstay, and means forming an integral portion of the roof structure at the edges thereof and concentrating the roof load at points opposite said brackets and distributing the load thereto whereby the roof is supported independently of the side arch portion.

5. A furnace of the class described, including a roof structure having lateral thrust bodies built into the edge portions thereof in spaced relation lengthwise of the roof and also having an edge portion disposed between said thrust portions and adapted to distribute the roof load received thereby to said thrust portions, a side arch structure at a side of the furnace and meeting the side edge of the roof structure, and means without the side arch portion for supporting and receiving the outward roof load supporting thrust of said thrust portions.

6. A furnace of the class described, having a roof structure with thrust bodies built in an edge portion thereof in spaced relation lengthwise of the roof and with longitudinally extending load distributing members bearing at their ends against opposing thrust bodies and distributing the roof load received thereby to said thrust bodies, a pillar and arch structure at the adjacent side of the roof and meeting the edge thereof, and means independent of said pillar and arch construction for supporting and receiving the outward roof load thrust of said thrust bodies and permitting a complete removal of the pillar and arch construction without affecting the roof support.

7. A furnace of the class described, having a transversely arched roof structure with longitudinally spaced thrust bodies in the side edge portions thereof and with jack arches intermediate said bodies and distributing the roof load to said bodies, a side arch structure meeting the edge of the roof, buckstays at opposite sides of the furnace, means tying the buckstays together, and means carried by the buckstays and adapted to support said thrust bodies and to receive the roof load thrust thereof independently of said side arch structure.

8. A furnace of the class described, comprising a side structure composed of longitudinally spaced pillars and arches built up of refractory blocks, a roof structure having its edges meeting the upper edges of said side structure, buckstays at the outer sides of the pillars, means bracing the buckstays, a bracket carried by each buckstay in elevated position and in turn carrying the upper portion of the associated pillar, and means built into the side edge portions of the roof structure and concentrating the roof load on said brackets through the pillar portions carried thereby.

In testimony whereof, I have hereunto signed my name to this specification.

DAVID H. GOODWILLIE.